Figure 1:
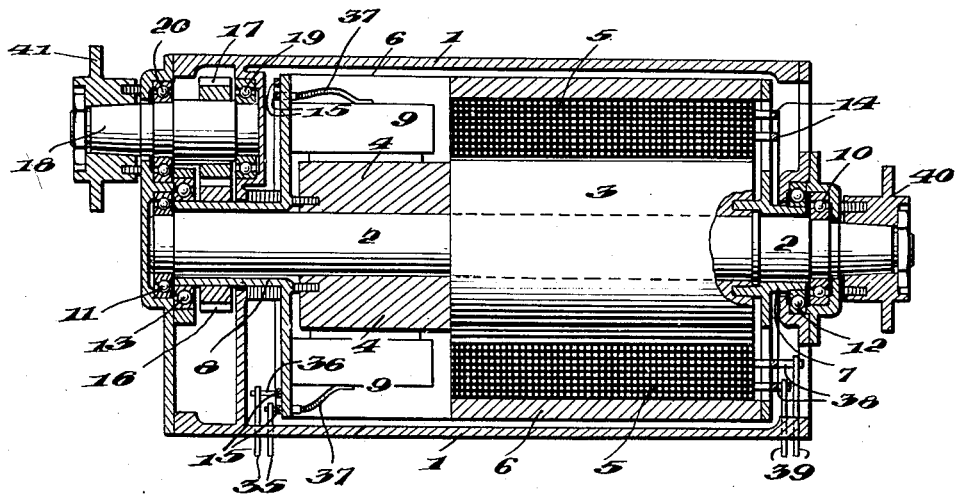

Dec. 18, 1945.    E. H. PIRON    2,391,103
MOTOR WITH SEPARATE DRIVE SHAFT
Filed Feb. 12, 1943

Inventor
EMIL H. PIRON,

By J. Windsor Davis
Attorney

Patented Dec. 18, 1945

2,391,103

UNITED STATES PATENT OFFICE 2,391,103

MOTOR WITH SEPARATE DRIVE SHAFTS

Emil H. Piron, New York, N. Y., assignor to Transit Research Corporation, New York, N. Y., a corporation of New York Application February 12, 1943, Serial No. 475,640

2 Claims. (Cl. 172—36)

This invention relates to electric motors and to the driving of a vehicle thereby, the essence of the invention residing in the simplification and reduction in weight of the driving means for a vehicle such as a street car, trolley bus or the like.

In street cars, in electrically propelled railroad cars and also in some electric locomotives it is conventional practice to drive each axle by a motor so that two motors are used to drive a two axle truck. Where more than one axle is to be driven by a motor it is the general practice to use connecting side rods, as is done in locomotives. In that case the torque of the motor must be doubled for two axles, trebled for three axles, etc., if the tractive effort of each axle is to be maintained at its full value. The strength and weight of the propeller shafts, transmission gears, main driving axle and other parts must be increased proportionally. Furthermore, when two or more axles are coupled together they must rotate at the same speed and the slip of the wheels on curves must be distributed between the axles. Very large forces are developed from axle to axle and corresponding stresses are developed in the axles, bearings and other parts.

It is highly desirable in street cars particularly where stops are frequent and where economy of weight is of primary importance that there be a reduction in weight of the propelling equipment by using a single motor but without the above mentioned complications found in locomotives. The principal object of this invention is to provide a single motor for driving the two axles of a truck, one axle being driven by the armature shaft, the other axle being driven by the field and frame of this same motor.

Another object of the invention is to provide a motor having practically the same weight as that of one of the motors of a conventional street car but which will develop twice the speed of a single motor. This becomes possible through recognition of the fact that by rotating both the field and the armature in opposite directions the magnetic speed therebetween is doubled without increasing the absolute armature speed. Neither the resultant centrifugal forces nor the bearing speed which is often near the practical limit is increased.

Among the advantages for this arrangement are the following: the two axles remain as independent as though driven by separate motors; inter-axle reactions are prevented; the torque on one axle is in perfect balance with the torque on the other axle; the torque on either axle and on gears and other parts is not increased; and, as stated, neither the centrifugal forces nor bearing speeds are increased.

Figure 2:
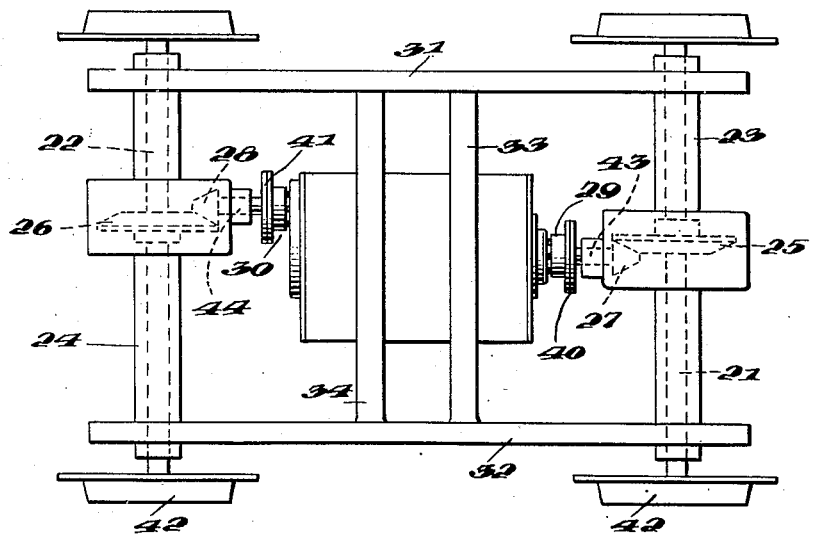

The invention will be better understood with reference to the accompanying drawing wherein my invention is illustrated and in which Figure 1 is a longitudinal diametric view through my improved motor, and Figure 2 is an elevational view of the motor installed in a rail truck.

More particularly, 1 indicates a casing or supporting housing which is adapted to be fixedly mounted in a vehicle as will be hereinafter explained. The casing 1 supports an armature shaft 2 having an armature 3 and a commutator 4, by bearings 10 and 11 at opposite ends thereof. Concentric about the armature 3 are field windings 5 which are mounted in the field housing 6. The housing 6 has hollow extension shafts 7 and 8 at opposite ends thereof through which the armature shaft 2 extends. These shafts 7 and 8 are directly supported for rotation by the casing 1 by means of the bearings 12 and 13, respectively.

In this arrangement it is seen that the reactions between the armature and the field cause the armature to rotate in one direction with its shaft 2 while the same reactions cause the field 5 and its housing 6 to rotate in the opposite direction. Since the field housing and the armature are supported in separate bearings the bearings speeds in each instance are determined by the absolute speeds of the housing 6 and armature 3 and not by their relative speed.

The commutator brushes are indicated at 9. In order to bring current to the commutator brushes I provide slip rings 15 equal in number to the number of motor connections but usually two in number, as illustrated. Cables 35 are led into the casing 1 and brushes 36 connect these cables with the rings 15. The leads 37 then connect the rings 15 with the brushes 9. Similarly, rings 14 are provided to carry current to the field 5 from brushes 38 which brushes are connected to cables 39 extending through the wall of the casing 1. It will thus be seen that the magnetic speed between the field and armature is double that of the absolute speed of each and that the brushes pass over the commutator 4 at the relative speed instead of at the absolute speed of either the armature or the field housing.

Keyed to the hollow shaft 8 is a gear 16 which engages with a second gear 17 keyed on a power take-off shaft 18 for transmission of the torque developed by the field housing 6. The shaft 18 is journalled in bearings 19 and 20 carried by the casing 1. Suitable couplings 40 and 41 may be mounted on the outer ends of the shafts 2 and 18 respectively.

The assembly as shown in Figure 1 is then mounted in a vehicle, for instance in a rail truck as shown in Figure 2. In this figure, the wheels 42 receive the axles 21 and 22 which are enclosed in axle housings 23 and 24. Bevel gears 25 and 26 on the axles 21 and 22 respectively engage pinions 27 and 28 which are mounted on propeller shafts 43 and 44 respectively. If necessary universal joints are inserted between the propeller shafts and the couplings 40 and 41.

The axle housings 23 and 24 are connected by the side frames 31 and 32 to form the truck frame which is re-inforced by the cross beams 33 and 34. These cross-beams support the motor housing 1 and whatever additional structure is chosen to complete the truck.

What I claim is:

1. The combination of an electric motor comprising an armature and shaft, field windings, a housing for said field windings, and a support in which said housing is rotatable, said support having bearings directly supporting said armature shaft at each end thereof for rotation in one direction and other bearings for supporting said housing at each end thereof for rotation in the opposite direction, and separate power take-off means for said housing and for said shaft.

2. The combination of an electric motor comprising an armature and shaft, field windings, a housing for said field windings, and a support in which said housing is rotatable, said support having bearings directly supporting said armature shaft at each end thereof for rotation in one direction and other bearings for supporting said housing at each end thereof for rotation in the opposite direction, two gears, one of which is fixed and concentric with said housing for rotation therewith, the other of which is keyed on a power-take-off shaft journalled in said support, said gears continuously engaging for continuous energization of said power take-off shaft, and means for taking off power directly from said armature shaft.

EMIL H. PIRON.